United States Patent
Calder et al.

(10) Patent No.: US 7,257,812 B1
(45) Date of Patent: *Aug. 14, 2007

(54) METHODS AND APPARATUS FOR MANAGING AN APPLICATION

(75) Inventors: Bartley H. Calder, San Jose, CA (US); Tao Ye, Sunnyvale, CA (US); Jesus David Rivas, San Francisco, CA (US); Jonathan D. Courtney, San Jose, CA (US); Keith L. Messer, Hayward, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,980

(22) Filed: Dec. 16, 1999

(51) Int. Cl.
*G06F 9/46* (2006.01)

(52) U.S. Cl. ............... 718/100; 718/104; 717/166

(58) Field of Classification Search ........ 718/100–104; 717/114, 162, 166
See application file for complete search history.

(56) References Cited

U.S. PATENT DOCUMENTS

| | | | |
|---|---|---|---|
| 5,283,561 A | 2/1994 | Lumelsky et al. | |
| 5,455,950 A | 10/1995 | Vasseur et al. | |
| 5,572,232 A | 11/1996 | Rhodes et al. | |
| 5,608,662 A * | 3/1997 | Large et al. ............ | 708/300 |
| 5,727,147 A | 3/1998 | Van Hoff ............ | 395/200.3 |
| 5,815,718 A | 9/1998 | Tock ............... | 395/705 |
| 5,950,008 A | 9/1999 | Van Hoff ............ | 395/707 |
| 5,966,542 A | 10/1999 | Tock ............... | 395/712 |
| 6,085,030 A | 7/2000 | Whitehead et al. .... | 395/200.33 |
| 6,202,208 B1 | 3/2001 | Holiday, Jr. | |
| 6,223,346 B1 | 4/2001 | Tock ............... | 717/11 |
| 6,266,716 B1 | 7/2001 | Wilson et al. | |
| 6,279,030 B1 | 8/2001 | Britton et al. | |
| 6,289,369 B1 * | 9/2001 | Sundaresan ............ | 718/103 |
| 6,339,841 B1 | 1/2002 | Merrick et al. ......... | 717/10 |
| 6,374,286 B1 | 4/2002 | Gee et al. ............. | 709/108 |
| 6,430,564 B1 | 8/2002 | Judge et al. .......... | 707/100 |
| 6,430,570 B1 | 8/2002 | Judge et al. | |
| 6,442,565 B1 | 8/2002 | Tyra et al. ........... | 707/103 |

(Continued)

FOREIGN PATENT DOCUMENTS

EP 0333617 A2 9/1989

(Continued)

OTHER PUBLICATIONS

"Java TV API Specification", Sun Microsystems, Inc., Jun. 1, 1999.*

(Continued)

*Primary Examiner*—Meng-Al T. An
*Assistant Examiner*—Lilian Vo
(74) *Attorney, Agent, or Firm*—Dorsey & Whitney LLP

(57) ABSTRACT

Methods and apparatus for managing execution of an application according to an application lifecycle. The application lifecycle is managed by an application manager through a set of commands that enable the application manager to cause the application to enter one of a plurality of states. In addition, the application can communicate with the application manager to indicate that the application cannot change its state as the application manager has requested or to request that the application manager change the state of the application to a particular state.

40 Claims, 15 Drawing Sheets

U.S. PATENT DOCUMENTS

| | | | |
|---|---|---|---|
| 6,496,871 B1 | 12/2002 | Jagannathan et al. | ....... 709/317 |
| 6,507,946 B2 | 1/2003 | Alexander, III et al. | |
| 6,513,155 B1 | 1/2003 | Alexander, III et al. | |
| 6,519,594 B1 | 2/2003 | Li | |

FOREIGN PATENT DOCUMENTS

| | | |
|---|---|---|
| EP | 0524071 A1 | 7/1992 |
| EP | 0524071 A1 | 1/1993 |
| EP | 0653742 | 5/1995 |
| EP | 0844766 | 5/1998 |
| EP | 0908821 A1 | 4/1999 |
| EP | 0908821 A1 | 4/1999 |
| GB | 2310335 | 8/1997 |
| WO | 9413107 | 6/1994 |
| WO | 9720413 | 6/1997 |

OTHER PUBLICATIONS

"Java TV API Specification", Sun Microsystems, Inc., Preliminary Draft 0.5.2, pp. 1-45. (was available on the Internet on approximately Jun. 14, 1999, not earlier than Jun. 1, 1999, and was provided to the standards body on May 12, 1999).

S. Deering, "Host Extensions for IP Multicasting", Network Working Group, Stanford Univeristy, RFC 1112, Aug. 1989, pp. 1-17.

Y. Rekhter, et al., "Address Allocation for Private Internets", Network Working Group, Silicon Graphics, Inc., RFC 1918, Feb. 1996, pp. 1-9.

D. Meyer, "Administratively Scoped IP Multicast", Network Working Group, University of Oregon, RFC 2365, Jul. 1998, pp. 1-8.

Bunt, R.B. "Scheduling Techniques For Operating Systems", *Computer*, Oct. 1976, pp. 10-17, XP000199223.

Thom, R. "Multitasking Fuer Mikrocontroller, Parallelverarbeitung fur sequentielle Systeme mit OS-51", *Elektonik*, 15/20.7.1990, XP000138192.

C.E. McDowell & E.A. Baldwin: *Unloading Java Classes That Contain Static Fields*, 97-18, Aug. 25, 1997, Baskin Center for Computer Engineering & Information Sciences, University of California, Santa Cruz, Santa Cruz, CA 95004, USA.

J.D. Mitchell & B. Foote: *Java Tip 52: Singletons vs. class (un)loading*, JAVAWORLD Online, retrieved form the Internet: URL:http://www.javaworld.com/javaworld/javatips/jw-javatip52_p.html Retrieved on Apr. 15, 2002. The whole document.

*Second Office Action* issued Jul. 9, 2004, citing previously-cited documents: EP0524071A1 and EP0908821A1; Chinese Patent Application No. 00810268.6, filed Jul. 13, 2000, *Methods and Apparatus For Managing An Application According To an Application Lifecycle.*

AU Examiner's Report No. 2 on corresponding patent application No. 60973/00, 2 pages, dated Mar. 3, 2005.

Bormann et al, "IP-Multicast Ueber Satellit", Funkschau, DE, Franzis-Verlag K.G. Munchen, vol. 71, No. 21, pp. 55-57, XP000851045, ISSN: 0016-2841, Oct. 2, 1998.

Clausen et al, "MPEG-2 as a Transmission System for Internet Traffic", IEEE International Performance, Computing and Communications Conference, US, New York, NY:IEEE, pp. 101-107, XP000668934, ISBN:0-7803-4469-3, Feb. 1998.

\* cited by examiner

Signal Data ~ 302

App_present_in_data_stream: BOOLEAN ~ 304

Location (e.g., directory, file name) ~ 306

Authentication ~ 308

Permissions ~ 310

FIG. 3

| Application Context | △~404 |
|---|---|
| Class loader identifier | 406 |
| Signal data identifier | 408 |
| Display context identifier | 410 |
| Application identifier | 412 |
| Application environment object | 414 |
| Current application state | 416 |

Application Programming
Interface (API)

```
                    702
                     /
Interface application  {                   706
                                            /
704 ⌒ public void init application (Application environment env);
708 ⌒ public void start application ();
710 ⌒ public void pause application();
712 ⌒ public void destroy application (boolean unconditional);
                                                  /
  }                                             714
```

FIG. 7

Application_environment Interface

```
                802
Interface Application_environment {
                                                            810
  804 — public void destroyed ();
  808 — public java.lang.object.get property (string key);
  806 — public void paused ();
  812 — public void resume_request ();
}
```

FIG. 8

METHODS AND APPARATUS FOR MANAGING AN APPLICATION

CROSS REFERENCE TO RELATED APPLICATIONS

This invention is related to U.S. patent application Ser. No. 09/465,994, filed on the same day as this patent application, naming Tao Ye et al. as inventors, and entitled "METHODS AND APPARATUS FOR IMPLEMENTING AN APPLICATION LIFECYCLE DESIGN FOR APPLICATIONS." That application is incorporated herein by reference in its entirety and for all purposes.

This invention is also related to U.S. patent application Ser. No. 09/465,995, filed on the same day as this patent application, which later issued as U.S. Pat. No. 6,701,334, naming Tao Ye et al. as inventors, and entitled "METHODS AND APPARATUS FOR IMPLEMENTING INDIVIDUAL CLASS LOADERS." That application is incorporated herein by reference in its entirety and for all purposes.

BACKGROUND OF THE INVENTION

1. Field of the Invention

The present invention relates generally to computer software. More particularly, the present invention relates to methods and apparatus for managing execution of an application.

2. Description of Related Art

The digital television revolution is one of the most significant events in the history of broadcast television. With the advent of digital television, high speed data transfer is possible via satellite, cable and terrestrial television channels. Digital television offers users more channels as well as significantly improved video and audio quality. Most importantly, digital television ushers in the age of true interactive television. For instance, digital receivers will be able to offer users a variety of enhanced services, from simple interactive quiz shows, to internet, and a mix of television and web-type content. As the market for digital television grows, content developers are looking for a feature-rich, cost-effective, and reliable software platform upon which to build the next generation of interactive television services such as Electronic Programming Guides, Video-On-Demand, and Enhanced Broadcasting.

Java is a leading commercial object-oriented language designed as a portable language that can run on any compatible device that supports the JAVA™ PLATFORM. For instance, Java is incorporated into all major Web browsers. Thus, Java runs on any web-enabled computer via that computer's Web browser. As such, Java offers great promise as the software platform for set-top boxes and digital television.

In object-oriented programming, code and data are merged into objects. Each object is defined via its class, which determines the properties and behavior of an object. In other words, objects are individual instances of a class.

In the desktop environment, certain resources associated with each loaded application (e.g., classes and objects) need not be frequently released or tightly monitored since memory is relatively unlimited. However, memory is a valuable resource in the environment of embedded systems, particularly in the area of digital television. Moreover, in an interactive digital television environment, it will be common to run multiple applications. A digital television service might consist of audio, video and one or more applications. For instance, when a television viewer changes the channel, each associated service or program provided by that channel will likely require that multiple classes be loaded. As a result, memory will continually be allocated to the applications and associated classes until the limited amount of memory is consumed. Once the memory is consumed, it will be impossible to run any further applications. This is particularly important since it will be undesirable to reboot the set-top box in the event of an error.

The JAVA PLATFORM currently defines a number of application models, each with its own lifecycle. In general, these application lifecycle models have been designed to address specific issues on the JAVA PLATFORM. For instance, the Applet was designed to provide support for executable content in web pages. However, none of the existing application lifecycle models fully address the requirements specific to systems having limited memory, such as television receivers. For instance, classes associated with an Applet, once loaded, its class objects will not be removed from memory. Moreover, it is impossible to determine when execution of the Applet has been terminated.

In view of the above, it would be beneficial if an application lifecycle were designed to address the requirements specific to television receivers. Moreover, it would be desirable if a mechanism for managing the loading and execution of an application according to an application lifecycle were designed.

SUMMARY

The present invention enables one or more applications to be managed. In addition, execution of one or more applications may be managed according to an application lifecycle. This is accomplished, in part, through the use of an application manager that is capable of initiating and monitoring changes in the state of the application. In this manner, applications may be executed in a consistent manner on a variety of platforms.

According to one aspect of the invention, an application manager loads the application and allocates resources to the application for use by the application throughout its execution. Once the application is loaded, the application manager executes the application according to an application lifecycle. This is accomplished according to one embodiment through an application interface that is visible to the application manager. Through this application interface, the application manager can initiate various state changes in the application. As one example, the application manager may request the application to pause its execution and enter a paused state. As another example, the application manager may request the application to continue its execution from the paused state and enter an active state.

According to another aspect of the invention, the application communicates information regarding its state and potential state changes to an application manager. According to one embodiment, this is accomplished, in part, through an application environment interface. Through this application environment interface, the application may request that the application manager cause a state change of the application. For example, the application may request that the application manager cause the application to enter the active state. In addition, the application may indicate through this application environment interface that the application cannot perform the service as requested and therefore has paused or terminated, as appropriate under the circumstances. Once the state of the application is changed (e.g., caused by the application manager or performed by the application), the application may communicate this state change to the application manager (e.g., through an application environment interface that is visible to the application).

According to yet another aspect of the invention, the application manager may terminate the application on a conditional or unconditional basis. When the application manager terminates the application unconditionally, the application must terminate. However, when the application manager terminates the application on a conditional basis, the application manager may terminate the application only when the application agrees to its termination. In this manner, the application manager may terminate applications and therefore release resources associated with applications in a manner that is agreed upon by the applications being terminated.

The present invention enables applications to be managed according to an application lifecycle by an application manager. This enables applications to be executed in a predictable manner regardless of the platform on which they are executed. Moreover, since the application manager monitors the current state of each of the applications, the application manager may release memory associated with each application immediately upon its termination. This is particularly useful in systems having limited memory, such as in a digital television receiver.

BRIEF DESCRIPTION OF THE DRAWINGS

The invention, together with further advantages thereof, may best be understood by reference to the following description taken in conjunction with the accompanying drawings in which:

FIG. 3 is a block diagram illustrating an exemplary data structure which is used to store signal data received by the application manager as shown in FIG. 2A.

FIG. 7 is a diagram illustrating an exemplary application interface identifying methods that may be called by an application manager during the lifecycle of an application.

FIG. 8 is a diagram illustrating an exemplary application environment interface identifying methods that may be called by an application during the lifecycle of an application.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

An invention is described herein that enables an application to be loaded and executed according to an application lifecycle. The sequence of steps by which an application becomes initialized, makes various state changes based on its environment, and eventually is destroyed is collectively known as the application lifecycle. According to one embodiment, this is accomplished through the use of an application manager that is capable of loading and managing execution of one or more applications. According to one embodiment, the application lifecycle is implemented through the use of two interfaces. First, an application programming interface enables the application manager to manage the execution of an application according to the application lifecycle. Second, an application environment interface enables the application to communicate to the application manager its desire to change from one state to another or, alternatively, indicate that it is unable to perform a state change as requested by the application manager. For example, an application may request that the application manager cause the application to enter an active state. As another example, the application may indicate that it has entered a paused state or a destroyed state (e.g., when it is unable to enter the active state as requested by the application manager). Thus, the application environment interface may enable the application communicate to the application manager that it has changed from one state to another since the application ultimately has the best knowledge of the state that it is in.

Figure 1:
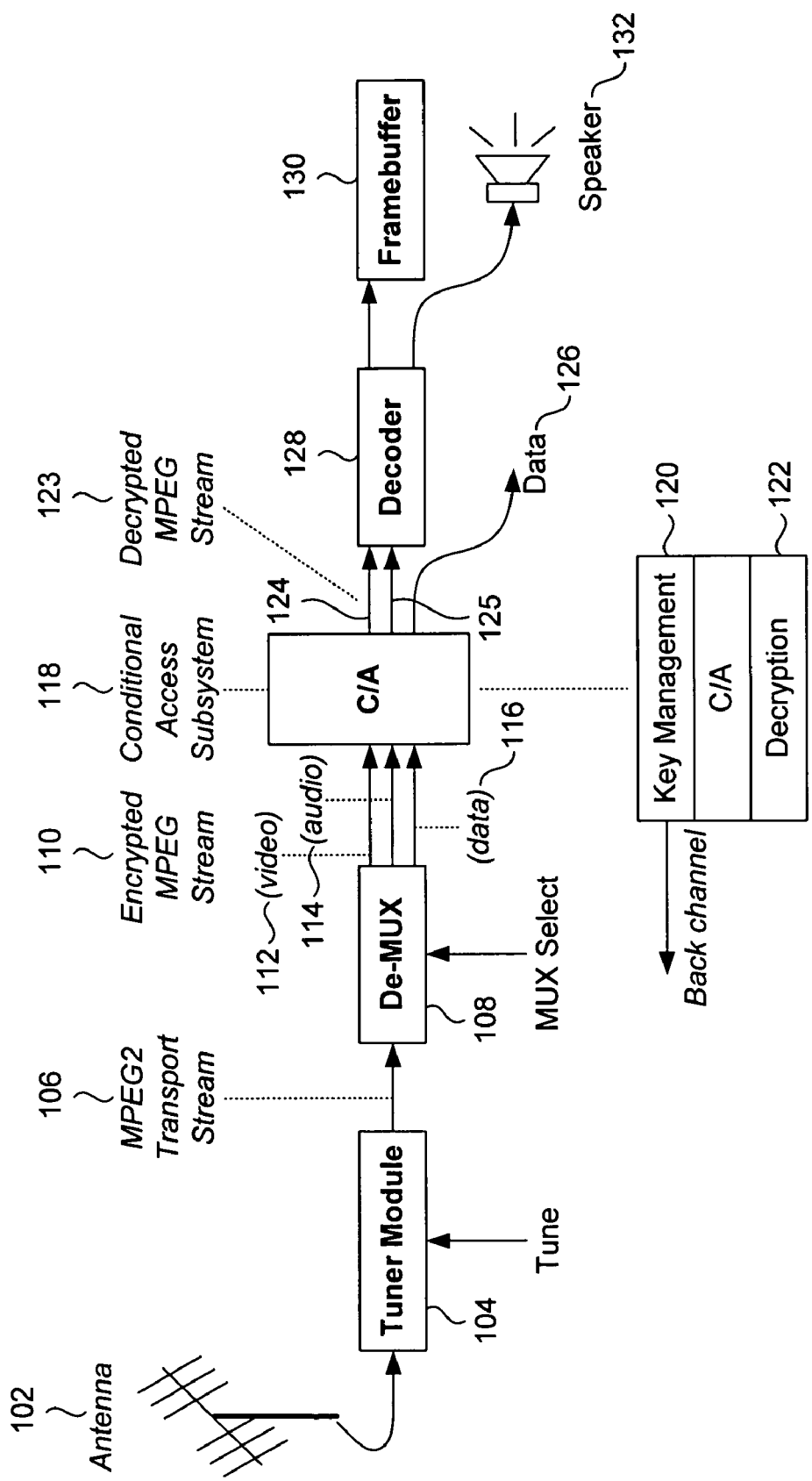
FIG. 1 is a block diagram illustrating a digital television receiver in which the present invention may be implemented.

The invention is described within the context of a digital television and digital television receiver. FIG. 1 is a block diagram illustrating an exemplary digital television receiver. As shown, a signal is received via antenna 102 and tuned by tuner module 104, producing MPEG2 transport stream 106. De-multiplexer 108 then produces encrypted MPEG streams 110 including a video stream 112, an audio stream 114, and a data stream 116. These three streams are then processed by conditional access subsystem 118. For instance, the conditional access subsystem 118 may utilize key management information 120 as well as decryption information 122 (e.g., decryption algorithms). The conditional access subsystem 118 produces decrypted MPEG streams 123 including a video stream 124 and audio stream 125 as well as data 126, all of which are decrypted. A decoder 128 then processes the decrypted MPEG stream 123, and forwards the decoded video data to frame buffer 130 and transmits the decoded audio data to speaker 132.

A Java Virtual Machine is one platform that may be used to implement the present invention to process information received by a digital television receiver such as that illustrated in FIG. 1. More particularly, when the data 126 (e.g., broadcast data stream) is processed, it is desirable to process information such as a downloaded application provided in the data 126.

Figure 2A:
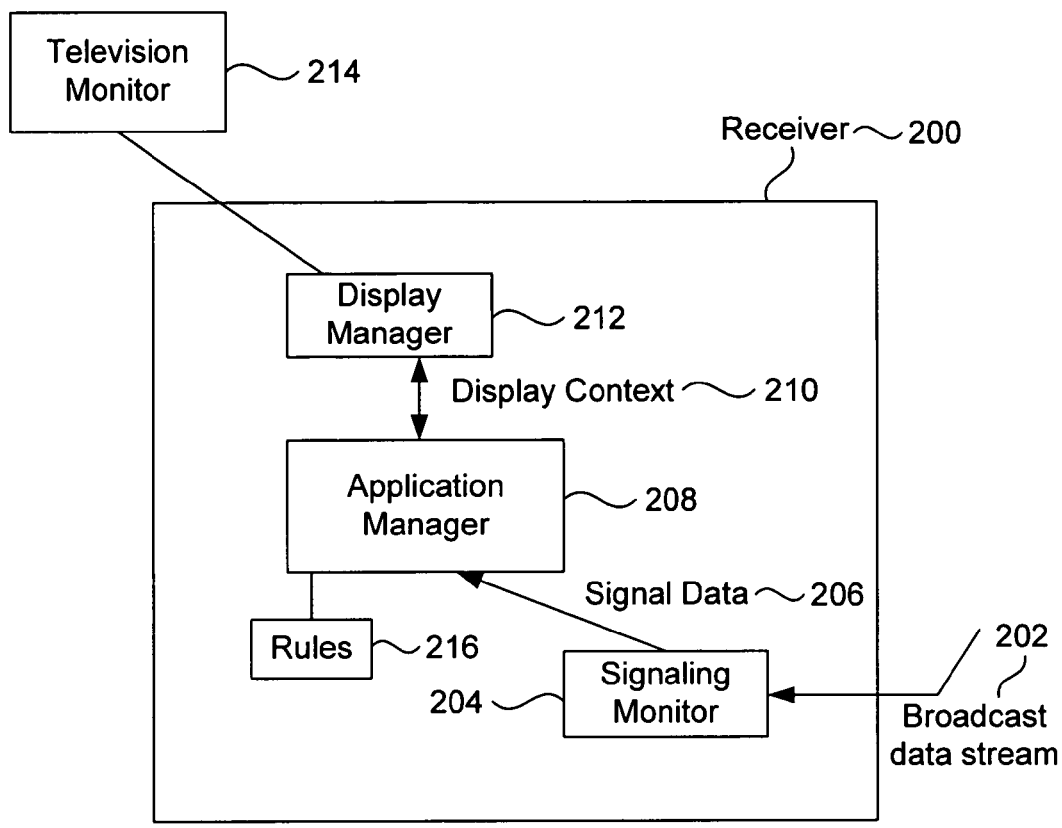
FIG. 2A is a block diagram illustrating one embodiment of the invention in which an application manager is implemented to manage applications that are loaded via the digital television receiver.

FIG. 2A is a block diagram illustrating one embodiment of the invention in which an application manager is implemented to manage applications that are loaded via the digital television receiver. As shown in FIG. 2A, the present invention may be implemented in a digital television receiver 200. A broadcast data stream 202 is received by a signaling monitor 204. The signaling monitor 204 determines whether an application is present in the broadcast data stream 202 and provides signal data 206 indicating the presence or absence of an application as well as data associated with the application such as the location of the application. The application manager 208 then loads and executes the application using this signal data 206. For instance, the application manager 208 may execute the application according to the appropriate application lifecycle so that the application enters the appropriate states in response to specific conditions. One implementation of the application lifecycle design will be described in further detail below. As the application executes, display information is provided in the form of a display context 210 from a display manager 212. The display manager then provides the appropriate display information for display on a television monitor 214.

Figure 2B:
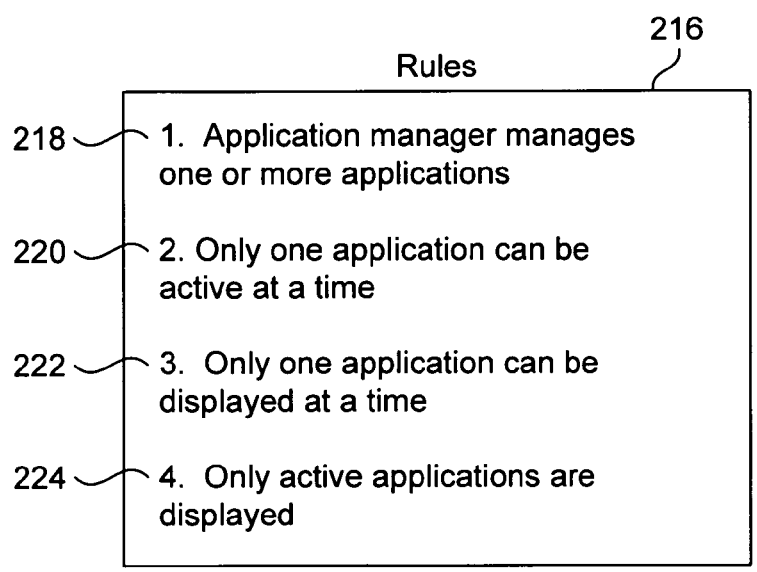
FIG. 2B is a diagram presenting an exemplary set of rules according to which the application manager shown in FIG. 2A may operate.

According to one embodiment of the invention, the application manager is configured to operate according to a set of rules 216. These rules may be specified in a variety of ways in order to implement an application lifecycle. For instance, an application lifecycle may enable an application to enter a loaded state, a paused state, an active state, and a destroyed state upon the occurrence of predetermined events. FIG. 2B is a diagram presenting an exemplary set of rules according to which the application manager shown in FIG. 2A may operate. This exemplary set of rules 216 includes four rules. A first rule 218 specifies that the application manager manages one or more applications. However, a second rule 220 specifies that only one application can be active (i.e., execute) at any given point in time. Moreover, a third rule 222 specifies that only one application can be displayed at any given point in time. Finally, a fourth rule 224 specifies that only active applications are displayed. Thus, a set of rules may be designed and configured for an application manager in a variety of ways. Accordingly, the set of rules may be designed to manage execution of one or more applications according to an application lifecycle.

FIG. 3 is a block diagram illustrating an exemplary data structure which is used to store signal data received by the application manager as shown in FIG. 2A. Signal data 302 includes an application present indication 304 in the broadcast data stream. If an application is present, a location 306 of that file (e.g., directory and file name) is specified. In addition, information such as authentication information 308 enabling the originator of the application to be authenticated as well as permissions 310 indicating that a particular action (e.g., read/write) can or cannot be performed in association with a specified source and/or destination.

Figures 4A, 4B:
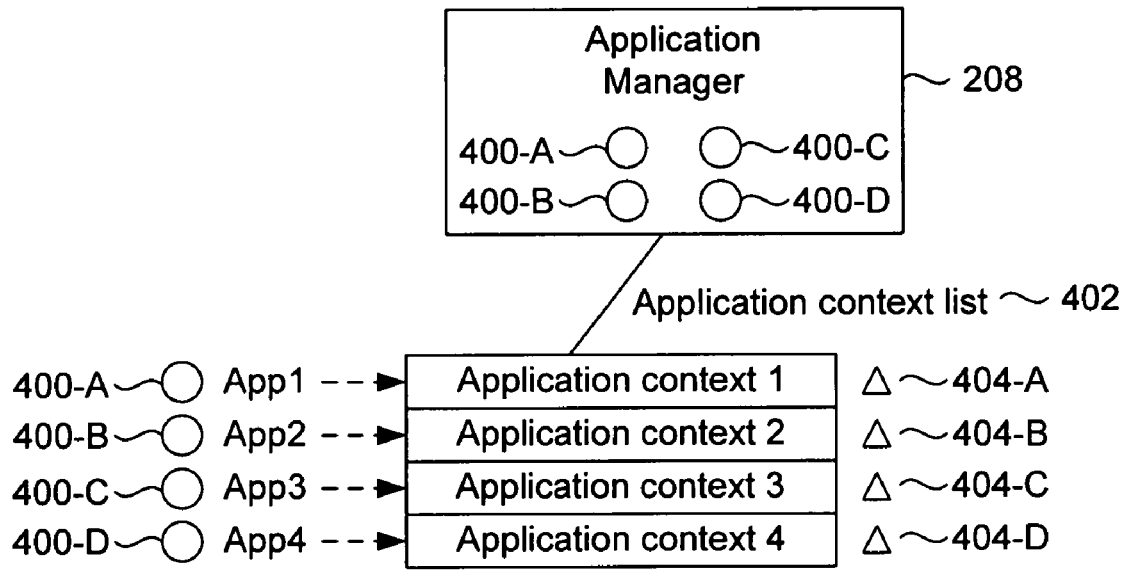
FIG. 4A is a diagram illustrating an exemplary context list that is accessed by the application manager during management and execution of associated applications.
FIG. 4B is a diagram illustrating an exemplary data structure used to store an application context identified in the exemplary context list.

The application manager 208 may simultaneously manage the lifecycle of numerous applications. According to one embodiment of the invention, in order to maintain information associated with each potentially executing application 400, the application manager manages an application context list 402. FIG. 4A is a diagram illustrating an exemplary application context list 402 that is accessed by the application manager 208 during management and execution of associated applications 400. As shown, the application context list 402 includes one or more entries, where each entry identifies an application context 404 that is associated with one of the applications 400. More particularly, applications 400-A, 400-B, 400-C, and 400-D represent four potentially different applications, with different application contexts 404-A, 404-B, 404-C, and 404-D, respectively. The application context 404 identifies information associated with an application to enable the application to be loaded as well as executed according to an application lifecycle.

According to one embodiment, information associated with an application is centralized and referenced by the application context 404. FIG. 4B is a diagram illustrating an exemplary data structure used to store an application context 404 identified in the exemplary application context list 402 presented in FIG. 4A. The exemplary data structure for the application context 404 includes a class loader identifier 406 that identifies a class loader, an object used to load classes into memory. Thus, the class loader identifier 406 enables the application manager to load one or more classes associated with the application via the identified class loader as well as unload these classes by de-referencing the class loader. In addition, the exemplary data structure for the application context 404 includes a signal data identifier 408 that identifies the signal data 302 as shown in FIG. 3. Thus, the application manager 208 may use this signal data identifier 408 to determine the location of an application as well as authentication and permission data. The exemplary data structure for the application context 404 further includes a display context identifier 410 that identifies a display context including information that will be used by the display manager 212 shown in FIG. 2A to display the application. For instance, the display context may include a reference to an object that allows the display of an application on a screen, such as the size, position, and visibility data. The exemplary data structure for the application context 404 further includes an application identifier 412 identifying the application. In addition, an application environment object 414 is identified that enables the application to communicate with the application manager. As one example, the application may wish to communicate its desire to enter another state or enter another state and communicate this state change to the application manager (e.g., communicate that it has entered the paused or destroyed state). As another example, the application may wish to obtain information related to the application environment (e.g., as maintained in the associated application context). The application environment object 414 will be described in further detail with reference to FIG. 8 and FIG. 9. The exemplary data structure for the application context 404 is further shown to identify the current application state 416. Thus, the application manager 208 maintains a record of the application state of each application.

Figure 5A:
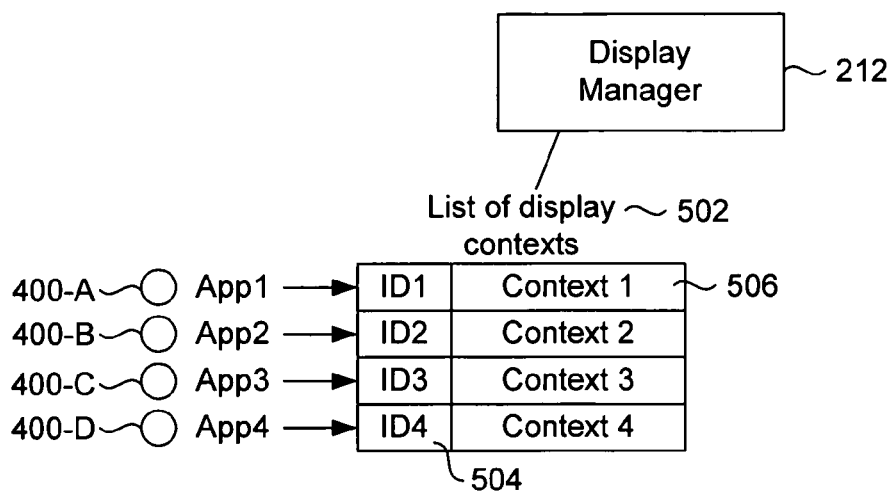
FIG. 5A is a block diagram illustrating an exemplary list of display contexts accessed by a display manager according to one embodiment of the invention.

As described above with reference to FIG. 2A, a separate display manager 212 may be implemented to manage access to the display device, as well as manage the data that is ultimately displayed. To facilitate this process, the display manager maintains a list of display contexts according to one embodiment of the invention. FIG. 5A is a block diagram illustrating an exemplary list of display contexts (display context list) 502 accessed by a display manager according to one embodiment of the invention. As shown, the display context list 502 includes one or more entries associated with one or more applications 400-A through 400-D. Each entry in the display context list 502 is associated with a context identifier 504 and identifies a display context 506 specifying information related to an application's display. In other words, the display context may be an object that holds the information needed by an application to display itself. Thus, when the display manager 212 wishes to display an application, it may "turn on" the appropriate "window" referenced in the corresponding display context, possibly by turning others off.

Figure 5B:
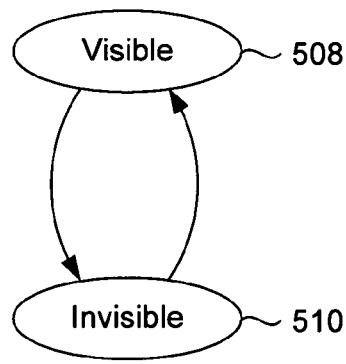
FIG. 5B is an exemplary state diagram associated with a display context.

The display context may be displayed according to a state diagram for the display context. FIG. 5B is an exemplary state diagram associated with a display context. As shown, the display context is visible 508 when in a first display state and invisible 510 when in a second display state. The appropriate display state is determined, according to one embodiment, by the rules followed by the application manager.

Figure 5C:
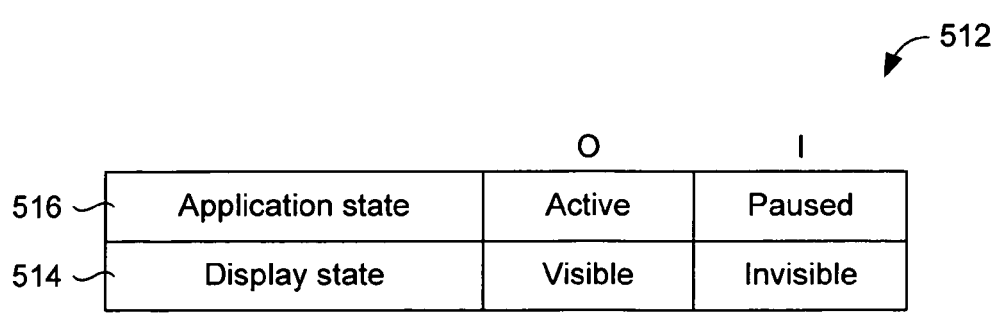
FIG. 5C is a diagram illustrating a set of exemplary display states generated according to a set of exemplary rules followed by the application manager.

FIG. 5C is a diagram illustrating a table presenting a set of exemplary display states generated according to a set of exemplary rules followed by the application manager, as shown and described above with reference to FIG. 2B. Table 512 illustrates all possible display states 514 and their associated application states 516. According to the exemplary set of rules followed by the application manager, only active applications are displayed. Thus, when an application is in the active state, the display state is visible. Alternatively, when an application is in the pa used state, the display state is invisible.

Figure 6:
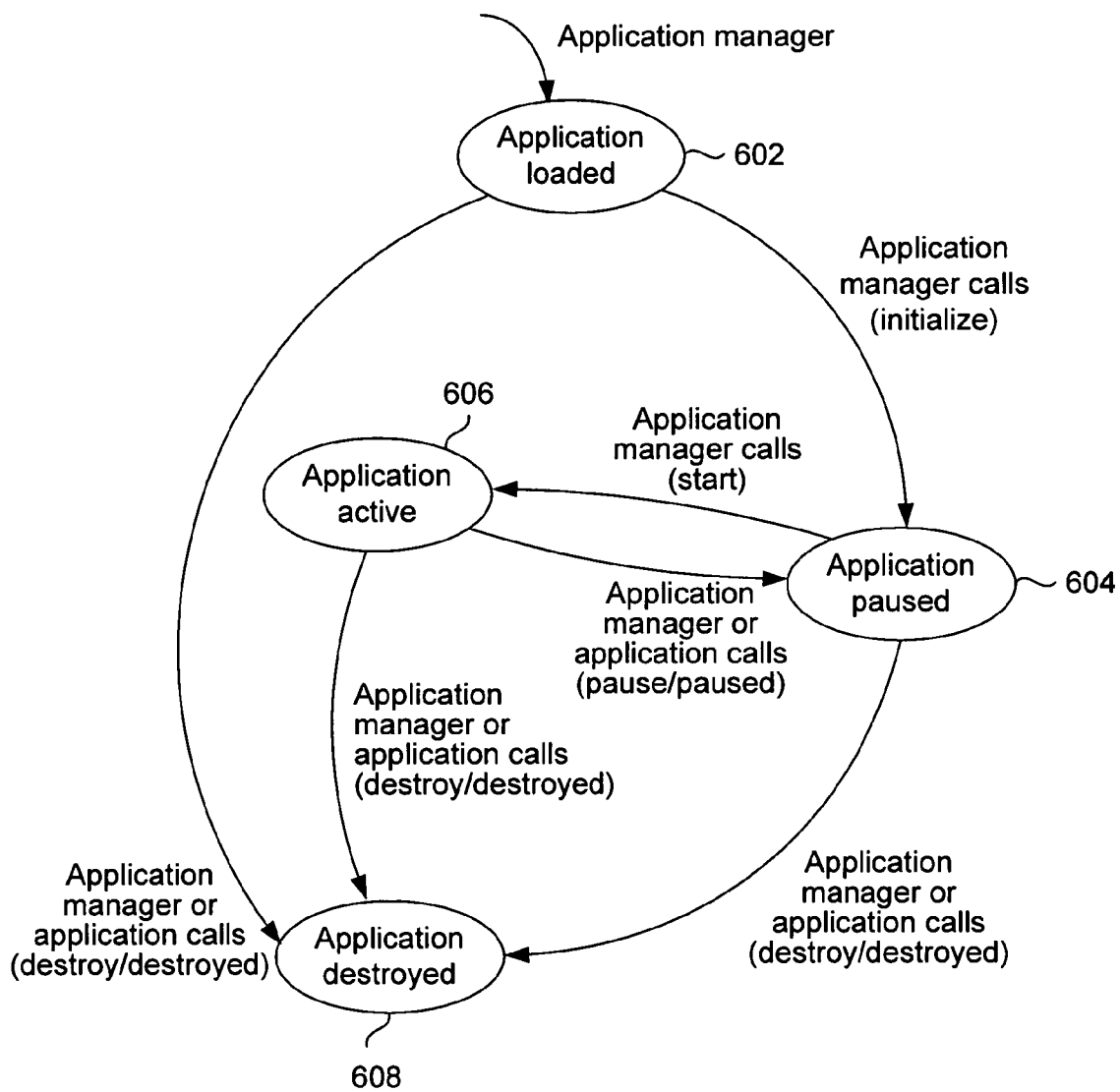
FIG. 6 is a state diagram illustrating a set of states which an application may enter during the lifecycle of the application.

An application lifecycle is implemented by enabling an application to enter a number of states under predetermined conditions. The states, as well as the conditions that determine when an application will enter each of the states, may vary according to the implementation of the application manager and the application lifecycle. FIG. 6 is a state diagram illustrating a set of states which an application may enter during the lifecycle of the application according to one embodiment of the invention. When the application manager loads the application, the application enters the loaded state 602. Once the application enters the loaded state 602, the application may enter the paused state 604 after its initialization by the application manager. Only the application manager can cause the application to change its state to the active state 606 from the paused state 604. However, either the application manager or the application may cause the application to enter the paused state 604 from the active state 606. In addition, either the application manager or the application can cause the application to terminate and enter the destroyed state 608 from the loaded state 602, the active state 606, or the paused state 604.

As described above with reference to FIG. 6, the state of the application may be changed by the executing application or an application other than the executing application (e.g., the application manager). In many object-oriented languages, methods and variables may be grouped into modules so that method names and parameters are visible to external processes (e.g., through an interface) while implementation details are hidden from those external processes. According to one embodiment, the interfaces and associated methods that are accessible to the application and the application manager are "packaged" into what will hereinafter be referred to as packages. Each package includes an associated interface that defines those methods names and parameters that are externally visible. In addition, each package has an associated body that includes the bodies, and therefore the implementation details, of the methods defined in the interface of the package. The application and application manager may use the two different interfaces to communicate. Thus, the application manager and the application can alter the state of the application through the use of two different interfaces, an application interface and an application environment interface, respectively. In addition, the application manager and the application can communicate information such as information regarding state changes or potential state changes.

FIG. 7 is a diagram illustrating an exemplary application interface identifying methods that may be called by an application manager (or other process) during the lifecycle of an application to change the state of the application. An application interface 702 defines all methods and associated parameters that may be called by the application manager. An initialize method 704 is available to enable the application manager to initialize the application. For instance, the initialize method 704 may signal the application to initialize itself and enter the paused state from the loaded state. According to one embodiment, a parameter of the initialize method 704 is an application environment object 706, which will be described in further detail below with reference to FIG. 8. The application environment object 706 may also be used by the application to access properties associated with the application's runtime environment, as will be described below. In addition, through the use of the application environment object 706, the application may retrieve the properties associated with its runtime environment. For instance, properties that may be retrieved include a reference to the signaling data and a reference to the environment the service is presented from (e.g., audio/video environment). In this manner, the application may initialize itself in preparation for its execution. Although the application preferably does not hold shared resources prior to executing, it should be prepared to execute in a reasonable amount of time. The initialize method 704 should only be called once. After the initialize method 704 returns successfully, the application is in the paused state. If the initialize method 704 cannot return successfully, the application returns a state change exception indicating that the application cannot enter the paused state.

Once the application is in the paused state, the application may enter the active state. However, only the application manager can cause this state change using a start method 708. The start method 708, once called, signals the application to start providing service and enter the active state. In the active state, the application may hold shared resources. A variety of failures may prevent the service from starting. For instance, the failure may be transient or non-transient. According to one embodiment, the application distinguishes between these two types of failures. For transient failures, a state change exception is raised. When a non-transient failure occurs, another exception may be raised or a done method may be called to properly terminate the method. For example, when the application determines that it cannot access the resources it needs to execute, this may be implemented as either a transient or non-transient failure.

A pause method 710, once called by the application manager, signals the application to stop executing and enter the paused state from the active state. In the paused state, the application stops executing and tries to use as few resources as possible. Thus, the application may release a portion or all of the shared resources held by it.

It may be desirable to terminate the application from any one of the loaded, active, or paused states. This may be accomplished by calling a destroy method 712. The destroy method 712 signals the application to terminate and enter the destroyed state. In the destroyed state, the application should release all resources and save preferences or state information.

When the application manager wishes to destroy (e.g., terminate) an application, it may be desirable to indicate various levels of urgency. According to one embodiment, the termination of an application is performed when a predetermined condition is satisfied. As one example, the predetermined condition may be the presence of a signal from the application agreeing to its premature termination. As another example, the predetermined condition may be the lack of receipt of a signal from the application within a specified period of time. This may be accomplished through a parameter 714 to the destroy method 712. The parameter 714 indicates that the destroy signal is conditional when in a first state and unconditional when in a second state. Thus, when the application manager merely wishes to request that the application terminate, it may specify that the destroy signal is conditional upon the application's decision to terminate. The application may indicate that it wishes to continue to execute and therefore not enter the destroyed state by raising a state change exception. If the application manager wishes to honor this request from the application, the application manager may call the destroy method again at a later time. Alternatively, the application manager may attempt to destroy another application that has, for example, a higher (or lower) priority. In this manner, the application manager may obtain resources needed by it (e.g., by the next application to be loaded) from only those applications which choose to terminate. Moreover, the application manager may attempt to destroy the applications in a specified order, such as a priority order, the application using the most (or least) amount of memory, or order in which execution has been initiated.

When the application manager needs a specific application to terminate, it may indicate this by specifying that the destroy signal is unconditional through the parameter 714 of the destroy method 712. For instance, the application manager may specify that the destroy signal is unconditional when all resources held by the application are needed by the application manager. Thus, the application manager may force an application to terminate and release resources held by it when the destroy signal is unconditional. Accordingly, even if an application raises a state change exception indicating that it wishes to continue to execute, the application manager may ignore this exception when the destroy signal is unconditional. Although the above-description refers to the conditional and unconditional termination of an application, other operations may similarly be performed conditionally and unconditionally.

As described above, an application environment object is passed to an application when the application is initialized. In addition, the application environment object provides an application with a mechanism to retrieve properties, as well as a way to signal internal state changes. According to one embodiment, the application environment object has an application environment interface that is available to the application being loaded and executed. More particularly, once the application is initialized, the application environment interface is available to the application.

FIG. 8 is a diagram illustrating an exemplary application environment interface identifying methods that may be called by an executing application during the lifecycle of the application. As will be shown and described below, an application environment interface 802 provides several methods allowing an application to discover information about its environment as well as communicate with the application manager regarding its state changes and desired state changes.

As described above, the application may enter the destroyed state from the loaded, active, or paused states. Moreover, the application manager or the application may cause the application to enter the destroyed state. As shown and described with reference to FIG. 7, the application manager may destroy the application by calling the destroy method. Alternatively, a destroyed method 804 of the application environment interface 802 enables the application to signal that it has entered itself into the destroyed state. The application manager then updates the application state to destroyed without calling the destroy method provided in the application interface, as described above with reference to FIG. 7. The application performs the same operations (e.g., clean up, releasing of resources) as if the application was destroyed by the application manager. This is preferably performed before the application enters itself into the destroyed state.

When the application is in the active state, the application manager or the application may cause the application to enter the paused state. More particularly, the application manager may pause the application using the pause method, as shown and described with reference to FIG. 7. Alternatively, the application may signal that the application does not want to be active and has entered the paused state via paused method 806.

A get property method 808 having a parameter 810 provides an application with a mechanism to retrieve one or more properties from the application environment object. As one example, in a Java environment, a "root container" is typically used to contain user interface components (e.g., pull-down menus, buttons) so that they can be displayed in the Java environment. Thus, the get property method 808 may be used to determine the root container in which components can be placed. As another example, information associated with the broadcast data stream (e.g., location of file within the broadcast data stream) may be obtained. Other properties may include, for example, a reference to a service session object (service context) and information specific to the underlying transport protocol.

Although only the application manager can cause an application to enter the active state, the application may wish to indicate that it is interested in entering the active state. This is accomplished, according to one embodiment, via a resume request method 812. Through the resume request method 812, one or more applications may each indicate a desire to enter the active state. However, the number of applications that may be simultaneously executed may be limited by the set of rules that the application manager follows. For instance, as described above with reference to FIG. 2B, the rules may specify that only one application can be active at a time. Thus, calls to the resume request method 812 may be used by an application manager to determine those applications that wish to enter the active state so that the application manager may select one or more of the requesting applications to move to the active state.

Through the above described interfaces, the application lifecycle can be controlled by both the application manager and the application. Although the interfaces are well-defined, the bodies of the methods shown and described above with reference to FIG. 7 and FIG. 8 may be implemented in a variety of ways, so long as the associated interface (and associated state machine) is complied with.

Figure 9:
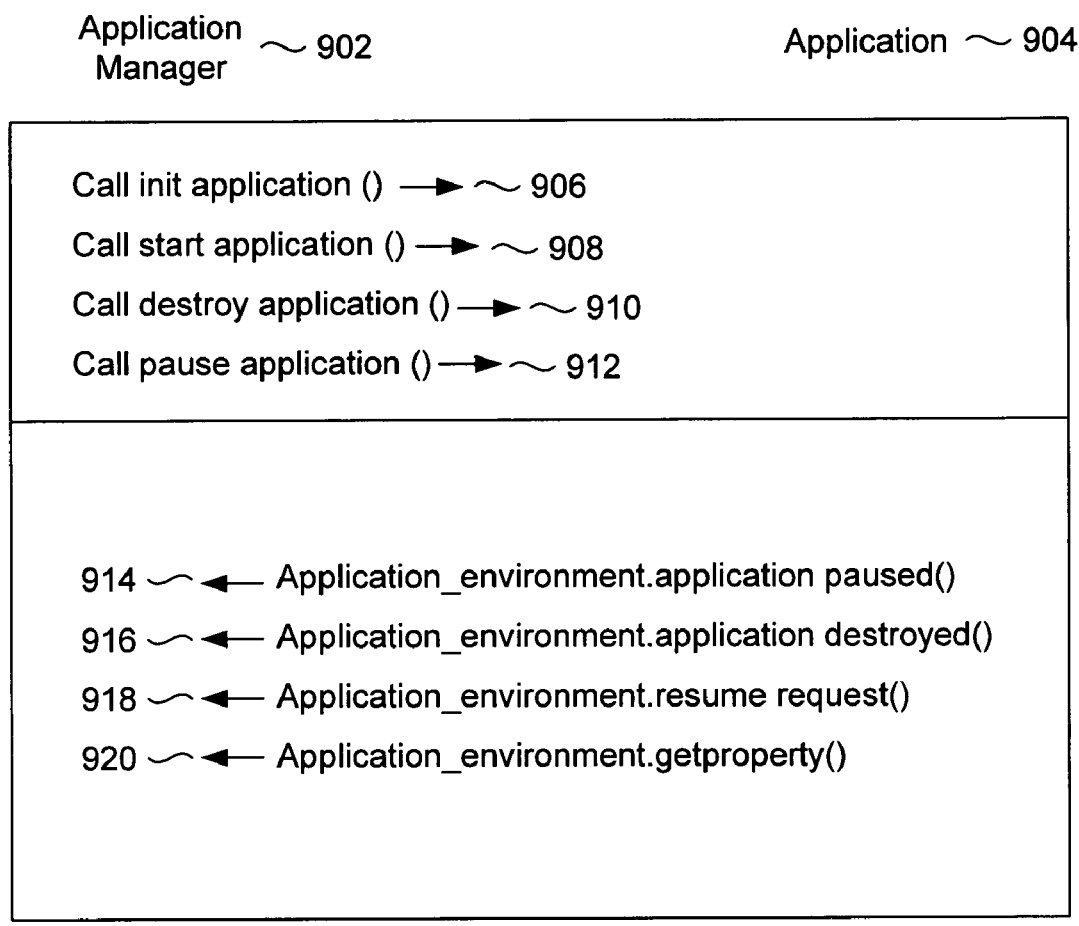
FIG. 9 is a diagram illustrating methods that may be called by either the application manager or an application during the lifecycle of the application.

FIG. 9 is a diagram illustrating exemplary methods that may be called by either the application manager or an application during the lifecycle of the application. As shown in FIG. 9, separate sets of methods may be called by the application manager 902 and each application 904 managed by the application manager 902. As previously described with reference to FIG. 7, a first set of methods may be called by the application manager 902, including an initialize method 906, a start method 908, a destroy method 910, and a pause method 912. Similarly, as previously described with reference to FIG. 8, a second set of methods may be called by a corresponding application 904, including a paused method 914, a destroyed method 916, a resume request method 918, and a get property method 920.

Figure 10:
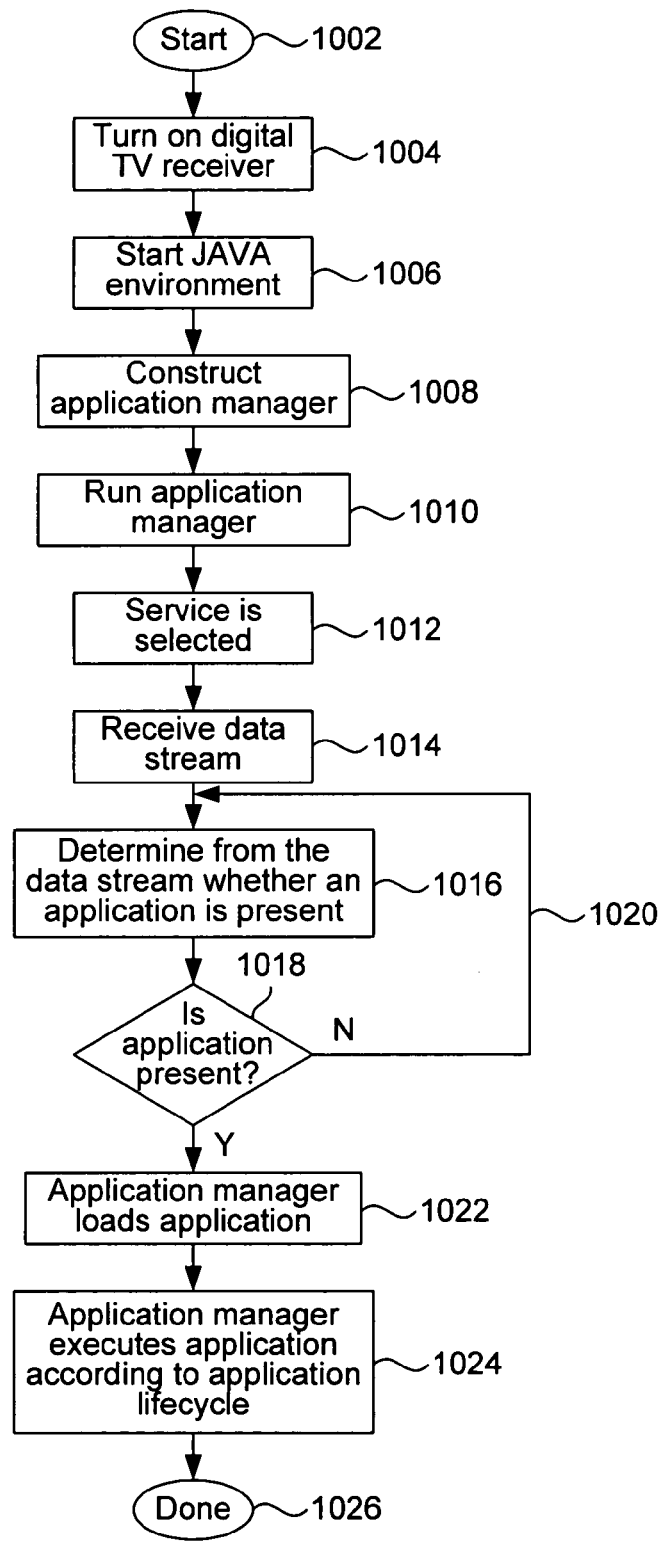
FIG. 10 is a process flow diagram illustrating one method of implementing an application manager to load an application and execute the application according to an application lifecycle according to an embodiment of the invention.

FIG. 10 is a process flow diagram illustrating one method of implementing an application manager to load an application and execute the application in accordance with an application lifecycle according to an embodiment of the invention. The process begins at block 1002 and at block 1004 the digital television receiver is turned on. The Java environment is then started at block 1006. An application manager is then constructed at block 1008 to manage the loading and execution of one or more applications. The application manager is then run at block 1010.

A variety of digital television services may be received by a digital television receiver such as that illustrated in FIG. 1. In addition to receiving a multitude of channels (or services), these services could range from interactive television, to near video-on-demand, to specialized programming. More particularly, a service provided by a television channel will often include audio, video, and an application. When a service is selected (e.g., by a user switching channels) at block 1012, a data stream associated with the selected service is received via the digital television receiver at block 1014. For instance, when the user switches to the Disney channel, the Disney service is selected and a data stream associated with the Disney service is received.

At block 1016 it is determined whether an application associated with the selected service is present in the data stream. For instance, when the user selects the Disney service, a Disney application may be received in the data stream. If it is determined that an application is present in the data stream at block 1018, the application manager loads the application as shown at block 1022 and executes the application according to the application lifecycle at block 1024. The loading and executing processes will be described in further detail below with reference to FIG. 11 and FIG. 12, respectively. The process completes as shown at block 1026. If there is no application present in the data stream, the process returns to 1020 to wait for new signals related to an application to be present in the data stream received at block 1014. The process then continues at block 1016.

Figure 11:
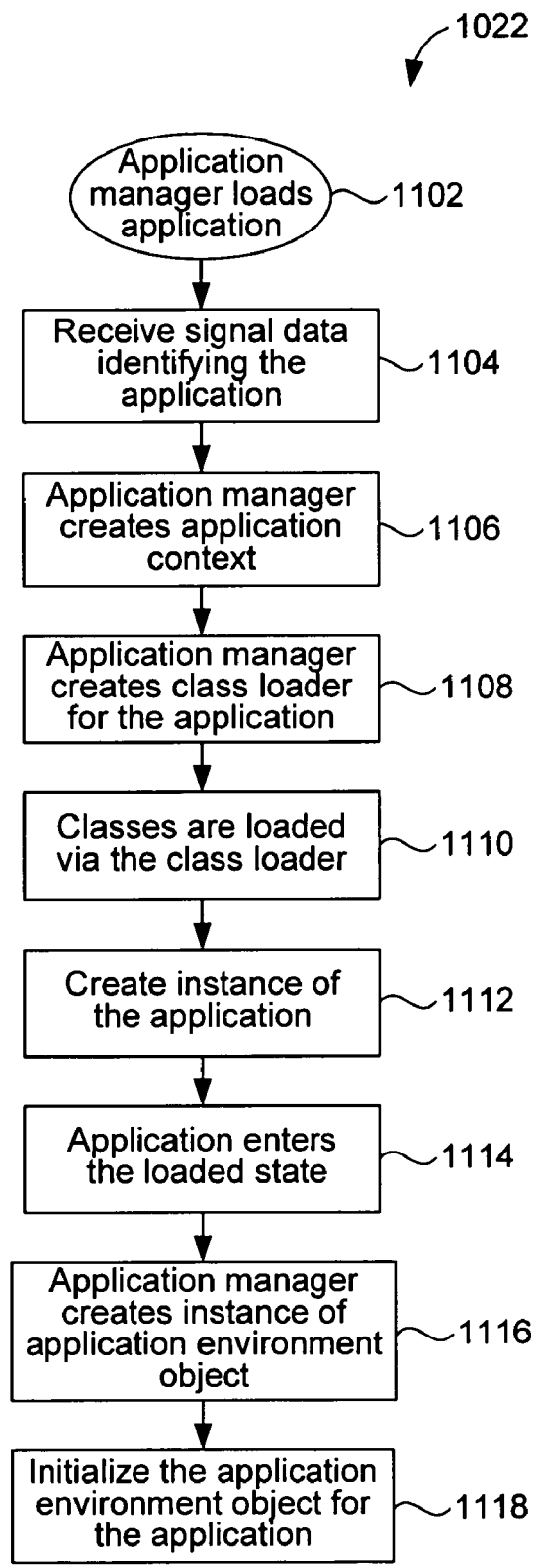
FIG. 11 is a process flow diagram illustrating one method of loading an application as shown at block 1022 of FIG. 10.

FIG. 11 is a process flow diagram illustrating one method of loading an application as shown at block 1022 of FIG. 10. The process begins at block 1102. At block 1104, signal data such as that illustrated in FIG. 3 is received by the application manager at block 1104. Once the signal data is received, the application manager can locate and load the application. In order to store information associated with the application, an application context such as that illustrated in FIG. 4B is created at block 1106. The application context may then be used to maintain a reference to all information associated with the application. For instance, once the application manager creates a class loader for the application as shown at block 1108, a reference to the class loader may be maintained in the application context. Classes associated with the application are then loaded via the class loader at block 1110. An instance of the application is then created from the classes at block 1112.

Once the application is instantiated, the application enters the loaded state as shown at block 1114. In order to enable the application to obtain properties associated with its environment and communicate with the application manager, an application environment object complying with an application environment interface such as that illustrated in FIG. 8 is instantiated at block 1116. The application environment object is then initialized for the application when the initialize method is called by the application manager at block 1118.

Figure 12:
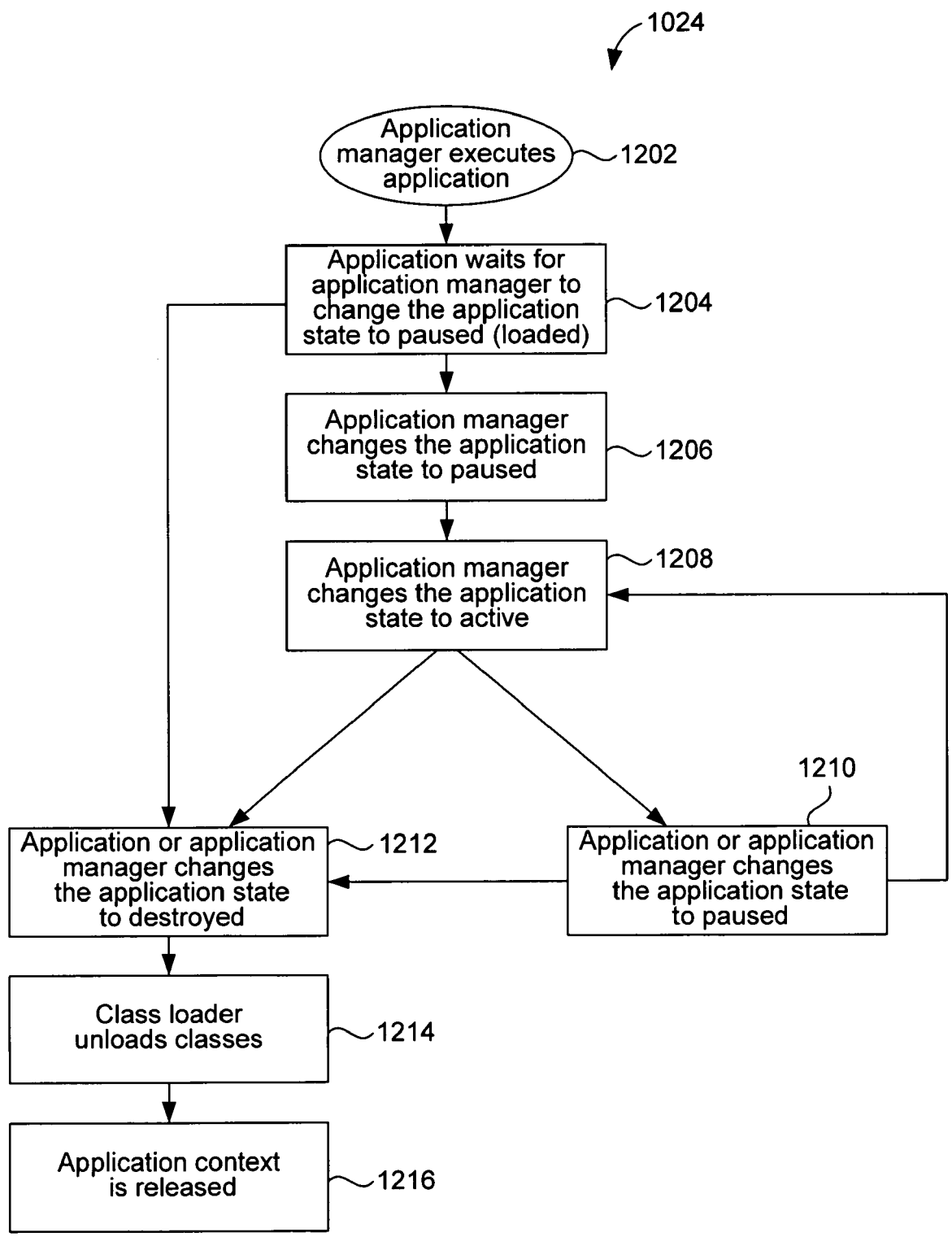
FIG. 12 is a process flow diagram illustrating one method of executing an application according to an application lifecycle as shown at block 1024 of FIG. 10.

In addition to loading the application, the application manager is responsible for monitoring and managing the execution of the application. FIG. 12 is a process flow diagram illustrating one method of executing an application according to an application lifecycle as shown at block 1024 of FIG. 10. Through the use of interfaces such as those illustrated in FIG. 7 and FIG. 8, the application and the application manager can propose, delay, prevent, or effect a change in the state of the application. The following is a simplified description of the manner in which the state of the application is changed throughout the lifecycle of the application. The process begins at block 1202. Once the application has entered the loaded state, the application waits at block 1204 for the application manager to change the application state to paused. For instance, as described above, the application manager may initialize the application using the initialize method provided in the application interface, causing the application to enter the paused state as shown at block 1206, as will be described in further detail with reference to FIG. 13. Once the application is changed to the paused state, the application manager thereafter eventually changes the application state to active at block 1208 (e.g., using the start method), as will be shown and described in further detail with reference to FIG. 14. It is important to note that only the application manager can cause an application to enter the active state. From the active state, either the application or the application manager can cause the application to enter the paused state at block 1210 through the paused method available in the application environment interface or the pause method available in the application interface, respectively. Once paused, the application may request that execution be resumed through the resume request method available in the application environment interface. The application or the application manager can also cause the application to terminate and enter the destroyed state at block 1212 via the destroyed method available in the application environment interface or the destroy method available in the application interface, respectively. As shown, the application may enter the destroyed state at block 1212 from any one of the loaded, paused, or active states. For instance, when the application completes execution, the application may enter the destroyed state. In addition, initiation of an action such as the loading, starting, or terminating of an application may be initiated in response to a signal received by the television receiver. This may occur, for example, when a new program begins or a user presses a button on the television's remote control to select a new channel. Once an application changes its state as requested (e.g., method returns as appropriate), the application manager updates the current state of the application in the associated application context, as shown in FIG. 4A and FIG. 4B. Although not described with reference to FIG. 12, the above state changes are performed in compliance with any state change exceptions raised by the application. Thus, inmost instances, when a state change exception is raised by the application, the application manager does not update the current state of the application. Instead, it may attempt to later request the same state change, another state change, or request a state change of another application.

Once destroyed, resources held by the application may be released. For instance, a signal may be received by the application manager (e.g., from the application or the broadcast environment via the receiver) to initiate clean-up of the application. More particularly, the class loader may unload the classes associated with the application at block 1214. In addition, the application context referenced by the application context list as shown in FIG. 4A and FIG. 4B may be released.

Figure 13:
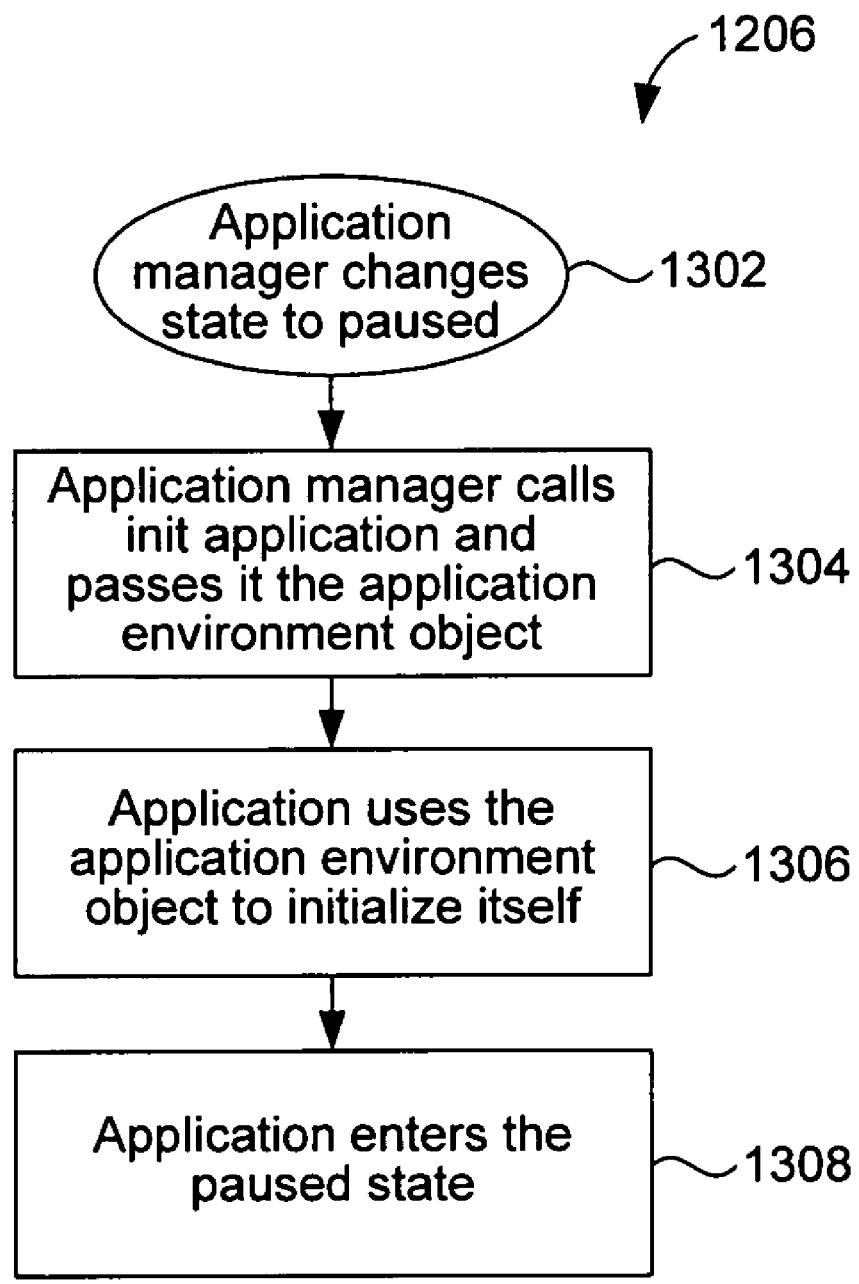
FIG. 13 is a process flow diagram illustrating one method of changing the state of an application from loaded to paused as shown at block 1206 of FIG. 12.

As described above, the application manager changes the state of an application from loaded to paused in order to prepare it for execution. FIG. 13 is a process flow diagram illustrating one method of changing the state of an application from loaded to paused as shown at block 1206 of FIG. 12. The process begins at block 1302. At block 1304, the application manager calls the initialize method in the application interface and passes the application environment object as the parameter. The application then uses the application environment object to initialize itself at block 1306. For instance, the application environment object may obtain properties such as the root container that it might use as it is initializing itself. Thereafter, the application enters the paused state as shown at block 1308.

Figure 14:
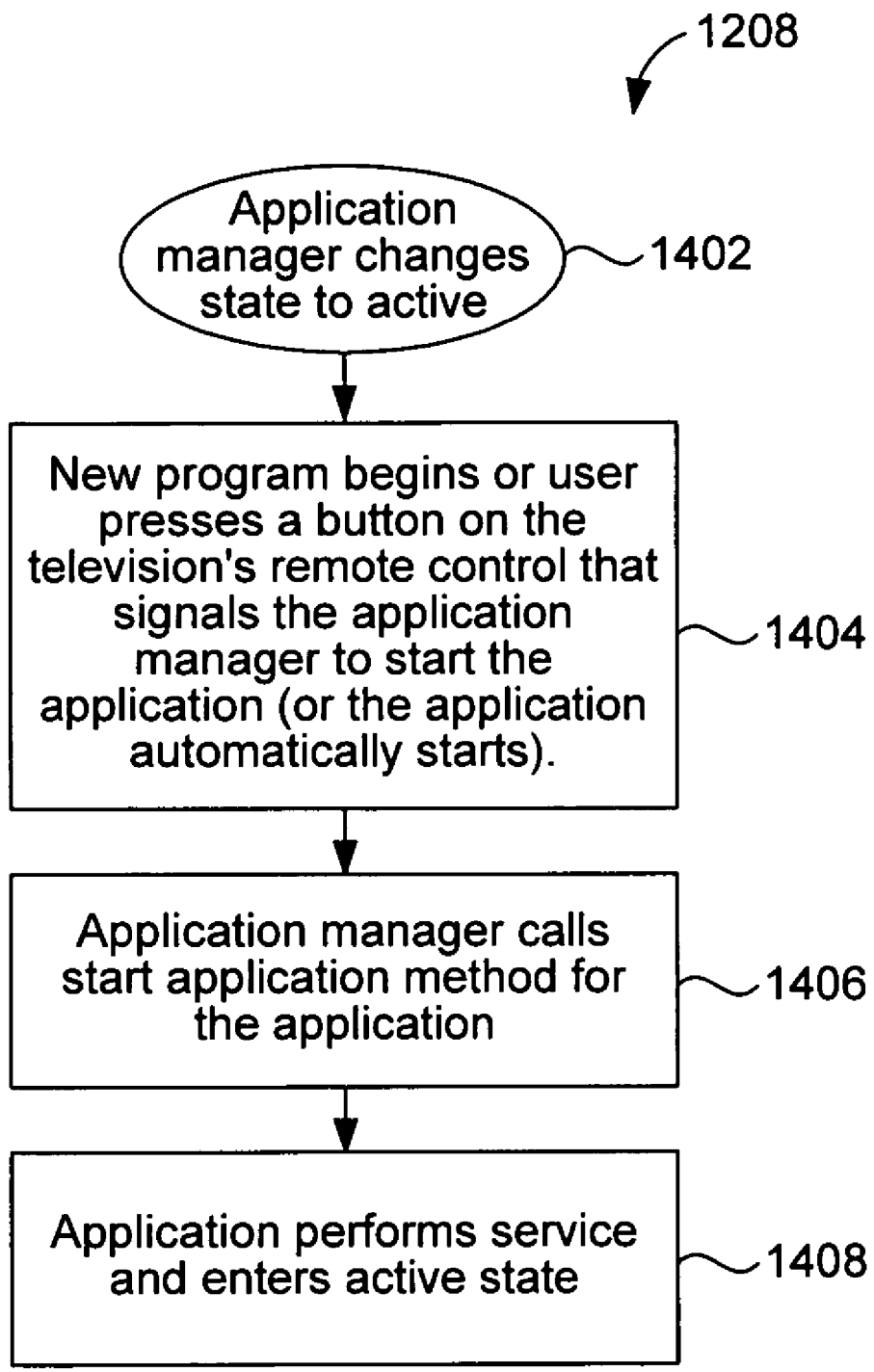
FIG. 14 is a process flow diagram illustrating one method of changing the state of an application from paused to active as shown at block 1208 of FIG. 12.

According to one embodiment, only the application manager can change the state of the application to the active state. FIG. 14 is a process flow diagram illustrating one method of changing the state of an application from paused to active as shown at block 1208 of FIG. 12. The process begins at block 1402. At block 1404, the application receives a signal to start the application. For instance, such a start signal may be received by the application manager when a new program begins or when a user presses a button on the television's remote control. For some services, the applications may auto-start when they are tuned. The application manager then calls the start application method as provided in the application interface as shown at block 1406. The application performs its service and enters the active state at block 1408.

The present invention may be applied in a variety of situations. One example is that of a stock ticker that is displayed at the bottom of a monitor (e.g., television screen) on various channels. The stock information may be obtained by a receiver from a broadcast service or a back channel to a central server or broadcaster (e.g., via modem, cable, or other connection to the Internet). Assuming that the stock ticker application is in the paused state after initialization, a user presses a button on the television's remote that signals the application manager to start the stock ticker application. The application manager calls the start application method for the stock ticker application. The application manager assumes at this point that the application is performing its service. Upon receiving the start signal, the stock ticker application creates a new thread that opens the back channel to retrieve the stock quotes. The stock ticker application is now in the active state.

While in the active state, the stock ticker application continues to show the stock quotes. However, due to circumstances beyond the control of the application, the stock ticker application may no longer be able to retrieve updated stock quotes. Under these circumstances, the application may decide to continue displaying the most recent stock quotes that it has available. However, after a period of time, the application may still be unable to open the back channel. The application may therefore decide that the quotes it is displaying are too old to present and that it can no longer perform its service. The application may then choose to take itself out of the active state by calling the paused method on the application environment object to signal this change to the application manager. Moreover, the application may at this point or at a later time decide that it no longer has any chance of performing its service, so it decides it should terminate. The application does some clean-up, releasing resources that are no longer required by the application. The application then terminates and calls the destroyed method on the application environment object to signal the application manager that it has entered the destroyed state. The application manager then does the corresponding clean-up of this application.

Figure 15:
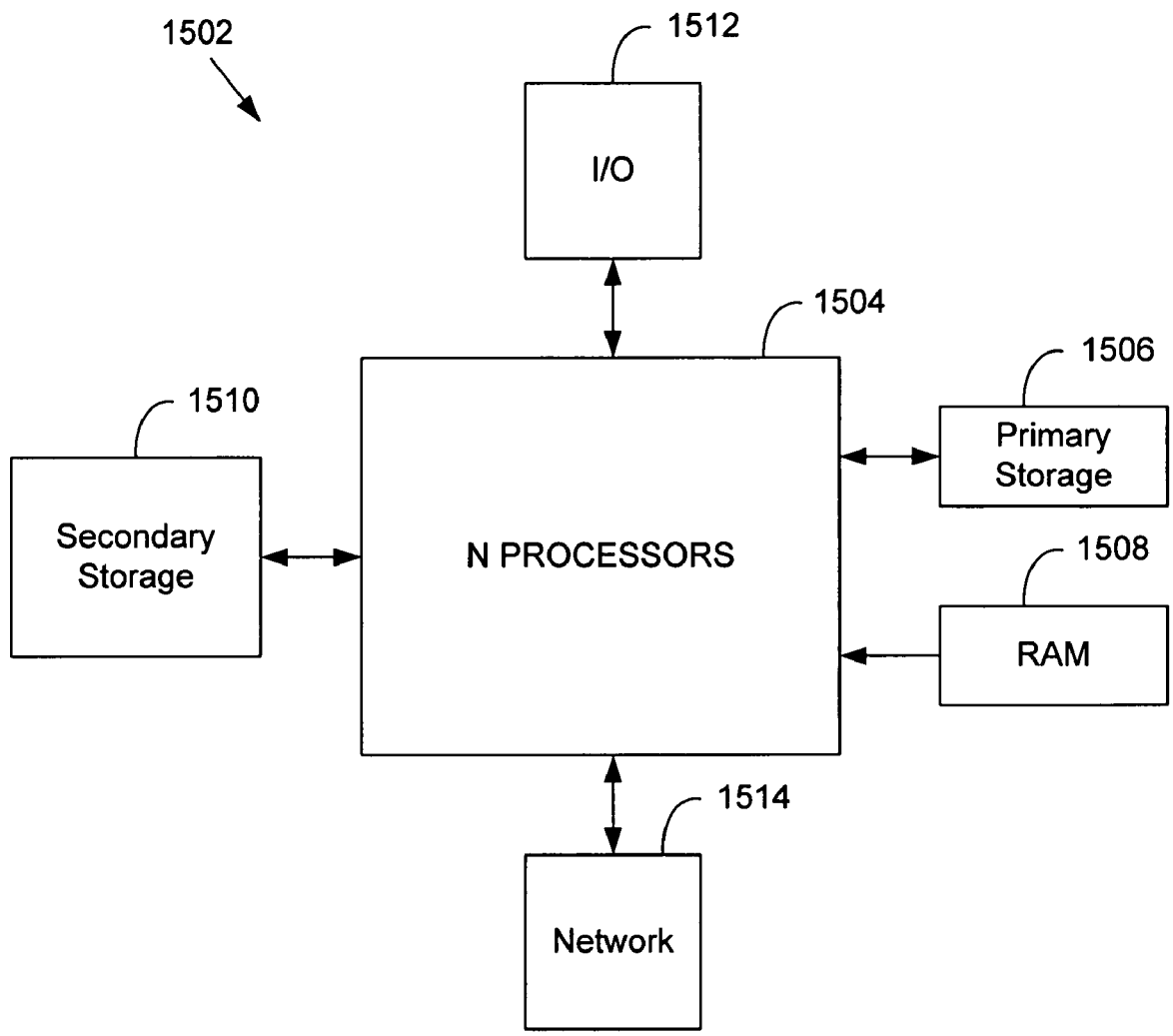
FIG. 15 is a block diagram illustrating a typical, general-purpose computer system suitable for implementing the present invention.

The present invention may be implemented on any suitable computer system. FIG. 15 illustrates a typical, general-purpose computer system 1502 suitable for implementing the present invention. The computer system may take any suitable form. For example, the computer system may be integrated with a digital television receiver or set top box.

Computer system 1530 or, more specifically, CPUs 1532, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Through the use of an application manager to load and manage execution of each application according to an application lifecycle, the execution of an application is standardized and memory resources are effectively conserved. The application lifecycle is implemented, in part, by controlling in a consistent manner the states that the application may enter. According to one embodiment, an interface defining appropriate methods for controlling the application lifecycle is provided for the application as well as the application manager. In this manner, the application and the application manager may communicate state changes, requests for state changes, requests that state changes be delayed or cancelled, as well as communicate other state information. Through the use of the present invention, an application may be run on different machines at different times, yet producing the same result in a predictable manner. Moreover, the present invention enables memory associated with an application to be released when it is determined that the resources are no longer required. Given the limited amount of memory resources in digital receivers and set-top boxes, the ability to manage memory resources in a digital television environment represents a significant improvement.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented within the context of a digital television receiver. However, the present invention may be used in other contexts. Moreover, although the present invention is described as being implemented on a JAVA PLATFORM, it may also be implemented on a variety of platforms. Moreover, the above described process blocks are illustrative only. Therefore, the implementation of the application manager and application lifecycle may be performed using alternate process blocks as well as alternate data structures. Moreover, although both the application manager and the application are described as having separate interfaces, these interfaces may include public methods that are visible to all applications as well as the application manager. Accordingly, the present embodiments are to be considered as illustrative and not restrictive, and the invention is not to be limited to the details given herein, but may be modified within the scope and equivalents of the appended claims.

What is claimed is:

1. A computer-implemented method of managing execution of an application according to a lifecycle, comprising:
   receiving a signal indicating that a new service is selected;
   initiating execution of the application when the new service is selected such that the application enters an active state;
   pausing execution of the application such that the application enters a paused state from the active state;
   receiving a resume request from the application that has been paused indicating that the application wishes to resume execution and enter the active state from the paused state; and
   starting execution of the application from which the resume request was received such that the application enters the active state from the paused state when the resume request is received from the application, thereby enabling the application to initiate its own state change from the paused state to the active state without human intervention.

2. A computer-implemented method of managing execution of a plurality of applications according to a lifecycle, comprising:
   initiating execution of each one of the plurality of applications such that the plurality of applications enter an active state;
   pausing execution of one of the plurality of applications such that the one of the plurality of applications enters a paused state from the active state;
   receiving a resume request from the one of the applications that has been paused, the resume request indicating that the one of the plurality of applications requests to resume execution and enter the active state from the paused state; and
   starting execution of the one of the plurality of applications from which the resume request was received such that the one of the plurality of applications enters the active state from the paused state in response to receiving the resume request from the application, thereby enabling the one of the plurality of applications to initiate its own state change from the paused state to the active state without human intervention.

3. A computer-implemented method of managing execution of an application according to a lifecycle, comprising:
   requesting a first time that the application change its state from a first state to a second state by sending a request to the application, wherein the request is a conditional request that is conditional upon the application's decision to change from the first state to the second state, thereby enabling the application to allow or prevent its own state change from the first state to the second state in response to the conditional request;
   determining whether the application has decided to allow its own state change from the first state to the second state in response to the conditional request by ascertaining whether the application has changed its state from the first state to the second state; and
   requesting a second time that the application change its state from the first state to the second state when it is determined that the application has not changed its state from the first state to the second state and a predetermined condition is satisfied, wherein the predetermined condition indicates that a specified period of time has elapsed or that the application is now able to perform the requested state change.

4. The method as recited in claim 3, wherein it is determined that the application has not changed its state when a state change exception is raised by the application.

5. The method as recited in claim 3, wherein it is determined that the application has not changed its state when the application rejects the requested state change.

6. The method as recited in claim 3, wherein it is determined that the application has not changed its state when the application is unable to perform the requested state change.

7. The method as recited in claim 3, wherein the second state is terminated.

8. The method as recited in claim 3, wherein the request includes a parameter, the parameter when in a first state indicating that the state change is conditional and unconditional when in a second state.

9. A computer-implemented method of managing execution of an application according to a lifecycle, comprising:
   requesting that the application change its state from a first state to a second state by sending a request to the application, wherein the request is a conditional request that is conditional upon the application's decision to change from the first state to the second state, thereby enabling the application to allow or prevent its own state change from the first state to the second state in response to the conditional request;
   determining whether the application has decided to allow its own state change from the first state to the second state in response to the conditional request by ascertaining whether the application has changed its state from the first state to the second state, wherein the first state is an active state indicating that the application is currently executing, the second state is a destroyed state indicating that the execution of the application has terminated, and the third state is a paused state indicating that execution of the application has paused such that the application can resume execution; and
   requesting that the application change its state from the first state to a third state when it is determined that the application has not changed its state from the first state to the second state.

10. The method as recited in claim 9, wherein it is determined that the application has not changed its state when a state change exception is raised by the application.

11. The method as recited in claim 9, wherein it is determined that the application has not changed its state when the application rejects the requested state change.

12. The method as recited in claim 9, wherein it is determined that the application has not changed its state when the application is unable to perform the requested state change.

13. An apparatus for managing execution of an application according to a lifecycle, comprising:
   a processor; and
   a memory, the processor and the memory being adapted for:
   requesting a first time that the application change its state from a first state to a second state by sending a request to the application, wherein the request is a conditional request that is conditional upon the application's decision to change from the first state to the second state, thereby enabling the application to allow or prevent its own state change from the first state to the second state in response to the conditional request;
   determining whether the application has decided to allow its own state change from the first state to the second state in response to the conditional request by ascertaining whether the application has changed its state from the first state to the second state; and
   requesting a second time that the application change its state from the first state to the second state when it is determined that the application has not changed its state from the first state to the second state and a predetermined condition is satisfied, wherein the predetermined condition indicates that a specified period of time has elapsed or that the application is now able to perform the requested state change.

14. The apparatus as recited in claim 13, wherein the first state is an active, paused, or loaded state and the second state is a destroyed state indicating that the application is terminated.

15. The apparatus as recited in claim 13, wherein it is determined that the application has not changed its state when a state change exception is raised by the application.

16. The apparatus as recited in claim 15, wherein the second state is an active state indicating that the application is being executed, and the state change exception is raised by the application when the application has entered itself into a paused state or a terminated state.

17. The apparatus as recited in claim 13, wherein it is determined that the application has not changed its state when the application rejects the requested state change.

18. The apparatus as recited in claim 13, wherein it is determined that the application has not changed its state when the application is unable to perform the requested state change.

19. A system for managing execution of an application on a computer according to a lifecycle, the system comprising:
   a processor; and
   a memory, the processor and the memory providing:
   one or more rules;
   an application manager capable of executing one or more applications according to the lifecycle, the lifecycle enabling each of the applications to enter one of a plurality of states in response to one or more associated predetermined commands, the application manager capable of selecting one of the predetermined commands to execute according to the one or more rules;
   a mechanism for enabling the application to perform at least one of initiate and prevent its own state change from a first one of the plurality of states to a second one of the plurality of states without human intervention; and
   an application environment object enabling the application to communicate with the application manager, thereby enabling the application to perform at least one of initiate its own state change, inform the application manager of the application-initiated state change, prevent its own state change, and inform the application manager that it is preventing its own change state change that has been requested by the application manager.

20. The system as recited in claim 19, further comprising:
   a signaling monitor coupled to the application manager and capable of receiving a data stream, the signal monitor adapted for determining whether an application is present in the data stream and communicating information associated with the application to the application manager.

21. The system as recited in claim 19, wherein the application manager is configured to store an application context for each of the applications, the application context identifying a current one of the plurality of states.

22. The system as recited in claim 21, wherein the current one of the plurality of states is identified by the associated application to the application manager.

23. The system as recited in claim 21, wherein the application context further identifies a class loader capable of loading one or more classes associated with the application.

24. The system as recited in claim 21, wherein the application context further identifies a display context including display information to be displayed.

25. The system as recited in claim 21, wherein the application context further identifies an application environment object that enables the application to retrieve properties associated with its runtime environment.

26. The system as recited in claim 19, further comprising an application environment object that enables the application to communicate a state change of the application to the application manager, wherein the state change has been initiated by the application without human intervention.

27. The system as recited in claim 19, further comprising an application environment object that enables the application to request that the application manager change the current state of the application from a paused state to an active state, thereby enabling the application to initiate its own state change from the paused state to the active state without human intervention.

28. The system as recited in claim 19, further comprising:
a display manager coupled to the application manager and adapted for managing a display context for each of the applications, the display context being in a first state when the display context is visible and being in a second state when the display context is invisible.

29. The system as recited in claim 28, wherein the display context is in the first state when the application is in an active state and in the second state when the application is in a paused state.

30. The system as recited in claim 28, wherein the state of the display context is determined according to the one or more rules followed by the application manager.

31. A digital television receiver for managing execution of an application according to a lifecycle, comprising:
means for determining from a data stream whether an application is present in the data stream;
means for loading an application when it is determined that an application is present in the data stream;
means for executing the loaded application according to the lifecycle, the lifecycle including a plurality of states;
means for enabling the application manager to cause the application to change from one of the plurality of states to another one of the plurality of states; and
means for enabling the application to prevent a change in state of the application requested by the application manager or to communicate to the application manager a state change of the application from one of a first set of the plurality of states to one of a second set of the plurality of states, wherein the state change of the application is initiated by the application without human intervention, and wherein means for enabling the application to communicate to the application manager that the application cannot change its state as the application manager has requested, thereby enabling the application to prevent its own state change.

32. The digital television receiver as recited in claim 31, wherein the second set of the plurality of states includes a paused state indicating that the application has been paused and a destroyed state indicating that the application has been terminated, thereby enabling the application to pause or terminate its own execution without human intervention.

33. The digital television receiver as recited in claim 32, further comprising:
means for releasing memory associated with the application when the application has been terminated.

34. The digital television receiver as recited in claim 31, further comprising:
means for enabling the application to request that the application manager change the state of the application from one of the first set of the plurality of states to one of the second set of the plurality of states, thereby enabling the application to initiate its own state change without human intervention.

35. The digital television receiver as recited in claim 31, wherein the first state is an active state and the second state is a paused state.

36. The digital television receiver as recited in claim 31, further comprising:
means for enabling the application to raise a state change exception indicating that the application cannot change its state as the application manager has requested.

37. The digital television receiver as recited in claim 31, further comprising:
means for enabling the application to raise a state change exception indicating that the application does not want to change its state as the application manager has requested, thereby enabling the application to prevent its own state change.

38. The digital television receiver as recited in claim 31, further comprising:
means for creating a class loader associated with each one of a plurality of applications such that a plurality of class loaders are generated, each of the plurality of class loaders being associated with only one of the plurality of applications, the class loader being adapted for loading one or more classes associated with the application;
means for employing the class loader to load the classes associated with one of the plurality of applications; and
means for instantiating the application using the classes that have been loaded by the class loader.

39. The digital television receiver as recited in claim 38, further comprising:
means for unloading the classes associated with the application when the application is terminated.

40. The digital television receiver as recited in claim 39, wherein the means for unloading the classes comprise:
means for de-referencing the class loader by an application manager.

* * * * *